United States Patent [19]
Nakatani et al.

[11] Patent Number: 6,063,823
[45] Date of Patent: May 16, 2000

[54] POLYSTYRENE RESIN FOAM AND PROCESS FOR PRODUCING THE FOAM BODY

[75] Inventors: Itsuki Nakatani, Kanuma; Masayuki Wakabayashi, Nishikata-machi, both of Japan

[73] Assignee: Dow Kakoh Kabushiki Kaisha, Tokyo

[21] Appl. No.: 08/836,990

[22] PCT Filed: Nov. 17, 1995

[86] PCT No.: PCT/JP95/02363

§ 371 Date: Aug. 22, 1997

§ 102(e) Date: Aug. 22, 1997

[87] PCT Pub. No.: WO96/16111

PCT Pub. Date: May 30, 1996

[30] Foreign Application Priority Data

Nov. 18, 1994 [JP] Japan ..................................... 6-285201

[51] Int. Cl.$^7$ ....................................................... C08J 9/14

[52] U.S. Cl. ................................................. 521/81; 521/139

[58] Field of Search ....................................... 521/139, 81

[56] References Cited

U.S. PATENT DOCUMENTS

| | | | |
|---|---|---|---|
| 5,086,080 | 2/1992 | Anfuso | 521/139 |
| 5,091,256 | 2/1992 | Bopp et al. | 521/139 |
| 5,189,072 | 2/1993 | Rhoads et al. | 521/139 |
| 5,641,549 | 6/1997 | Johnston et al. | 521/81 |
| 5,898,039 | 4/1999 | Smith et al. | 521/81 |

*Primary Examiner*—Morton Foelak

[57] ABSTRACT

A blowing agent comprising a hydrofluorocarbon having at least one hydrogen atom and containing no chlorine is used to obtain a polystyrene-based resin foam body with a high expansion rate, employing as the base polymer a resinous blend comprising polystyrene and a polymer containing oxygen, nitrogen or fluorine or a resinous blend comprising polystyrene and an oxy acid or its derivative.

14 Claims, No Drawings

POLYSTYRENE RESIN FOAM AND PROCESS FOR PRODUCING THE FOAM BODY

TECHNICAL FIELD

The present invention relates to a process for preparing a polystyrene-based resin foam body.

BACKGROUND ART

A widely used process for preparing polystyrene-based resin foam bodies is one by which a volatile blowing agent is added to a molten resin and the mixture is kneaded under high temperature and pressure and then, after temperature adjustment, extruded through a low temperature, low pressure zone to foam the mixture and obtain an extruded foam body.

As such extruded foam bodies of polystyrene-based resins are light-weight and have excellent insulating properties as well as being relatively economical, they have found wide use as insulating materials for buildings.

Conventional production of such polystyrene-based resin foam bodies has involved the use of saturated chlorofluorocarbons (hereunder, CFCs) such as dichlorodifluoromethane (F-12), dichlorotetrafluoroethane (F-114) and trichlorofluoromethane (F-11). This is because the incombustibility and low thermal conductivity of these special freons are extremely useful for extruded foam insulating materials which must have excellent insulating properties.

However, since these special freons are very stable chemically, after they escape from the foam body they diffuse into the atmosphere and rise to the stratosphere without being degraded and result in destruction of the ozone layer, for which reason restrictions on their production and use are presently being promoted on a worldwide scale.

In place of the above-mentioned freons there have also been used hydrochlorofluorocarbons (hereunder, HCFCS) such as 1-chloro-1,1-difluoroethane (F-142b), monochlorodifluoromethane (F-22) and 1-chloro-1,2,2,2-tetrafluoroethane (F-124). Since these HCFCs have a hydrogen atom in the molecule, the lifetime of the molecule is shorter than the above-mentioned special freons and as a result they are less destructive to the ozone layer.

Nevertheless, the ozone destruction parameter (ODP) is not completely reduced to zero by including a hydrogen atom in the molecule, and thus restrictions will almost certainly be placed on their use as with special freons. Therefore, it has become an important and urgent issue to develop a blowing agent with an ODP of zero and low thermal conductivity, to replace HCFCs.

When aliphatic hydrocarbon-based blowing agents such as propane or butane have-been used in place of HCFCs, it has been impossible to obtain foam bodies with the same low thermal conductivity achieved by using the aforementioned special freons (especially F-12) or HCFCS. Furthermore, the flammability of these blowing agents has led to combustion of the resultant foam bodies, leaving a problem from the viewpoint of safety.

Here, the present inventors have made efforts to obtain extruded foam bodies with excellent insulating properties using as blowing agents hydrofluorocarbons (hereunder, HFCs), i.e. fluorocarbons with at least one hydrogen atom and containing no chlorine, which have an ozone destruction parameter of zero and excellent thermal conductivity. These contain no chlorine atoms in the molecule and thus are not ozone-destructive. Furthermore since they contain at least one hydrogen atom in the molecule, they have a short lifetime in the atmosphere and are thus considered to contribute very little to the greenhouse effect.

Despite the above-mentioned advantages of these HFCs, however, their low compatibility with polystyrene-based resins means that when large amounts of HFCs are added for more satisfactory insulating properties, under conventional production conditions, gas is released inside the die from the molten resin during the extrusion foaming which causes occurrence of foaming prior to leaving the die and thus leaves the resin torn, making it impossible to obtain aesthetically pleasing foam bodies which are uniform and have a high expansion ratio. Methods of further raising the pressure of the system in order to increase the solubility of HFCs in polystyrene have been considered. However, even when the system pressure is raised, many nuclei are generated in the die land before release to atmospheric pressure, because of the low solubility of the HFCs. The strong nucleating effect of the HFCs due to growth of the many generated nuclei in the small cells considerably lowers the air bubble size, making it impossible to obtain foams with large cross-sectional areas. As a result the density is notably increased and the desired expansion ratio cannot be achieved. In addition, the high vapor pressure of HFCs complicates molding and makes it difficult to obtain aesthetically pleasing foam bodies.

In Japanese Unexamined Patent Publication No. 4-62134 which is aimed at overcoming the aforementioned problems, there is disclosed a foaming method based on processing conditions of low temperature, high pressure and a long residence time in order to suppress the phenomenon of release of gas with low solubility in polystyrene resins.

Also, Japanese Unexamined Patent Publication No. 4-363340 proposes improving the solubility of poorly-soluble gas in polystyrene by the additional use of a cavity transfer mixer.

Nevertheless, the method disclosed in Japanese Unexamined Patent Publication No. 4-62134 still has the following unsolved problems in terms of practicality.

1) Since the foaming efficiency of the gas is lowered by carrying out the process at low temperature, ethyl chloride and/or methyl chloride, which are highly soluble in polystyrene-based resins, must be added in larger amounts than conventionally required to achieve the desired expansion ratio. Foam bodies obtained in this manner have the undesirable effect of inferior mechanical strength and dimensional stability due to plasticization of the cell membrane-forming resin by the readily soluble blowing agent.

2) Because of the great load exerted on equipment of the prior art to maintain the high pressure conditions of the process, it becomes necessary to switch to more expensive equipment with high pressure specifications, thus resulting in higher costs. Also, as the aperture of the nozzle (die) must be reduced to maintain the pressure of the system, the shear rate in the die is increased resulting in inevitable rise in frictional resistance between the molten resin and the die land surface, and it is thus difficult to obtain satisfactory skin surfaces and the surface smoothness is impaired. In addition, since the blow-up ratio must be made larger, it becomes difficult to stably obtain foam bodies with large cross-sections.

3) Costs also become higher since either the extrusion output must be lowered to lengthen the residence time or the equipment itself must be lengthened.

4) Even with optimization of the 3 processing conditions of temperature, pressure and residence time, many nuclei are generated in the die land prior to release to atmospheric pressure due to the low solubility of the HFCs. The strong nucleating effect of the HFCs due to growth of the many generated nuclei in the small cells considerably lowers the air bubble size, making it impossible to obtain foams with large cross-sections areas. As a result the density is notably increased and the desired expansion ratio cannot be achieved. In addition, the high vapor pressure of HFCs complicates molding and makes it difficult to obtain aesthetically pleasing foam bodies.

In the method in Japanese Unexamined Patent Publication No. 4-363340, there is greater loss of pressure in the equipment, and thus increasing the pressure results in greater equipment cost. Moreover, for the same reasons mentioned above, it is difficult to obtain foam bodies with high expansion rates and large cross-sections.

DISCLOSURE OF THE INVENTION

The present invention has been accomplished with the aim of overcoming the disadvantages of the prior art described above, and it employs HFCs which are completely non-destructive to the ozone layer, while improving the solubility of these HFCs in polystyrene-based resins to suppress release of gas in the die during extrusion foaming. It is also an object thereof to provide a preparation process therefor which allows addition of sufficient amounts of HFCs to obtain foam bodies with desired expansion rates, cross-sections and thermal conductivity without increasing the load on the equipment, as well as polystyrene-based resin foam bodies obtained thereby.

That is, the gist of the present invention resides in the following aspects (1) to (4).

(1) A process for preparing a polystyrene-based resin foam body, characterized by heating and melting in an extruder a resinous blend comprising 0.1 to 30 parts by weight of a polymer containing oxygen, nitrogen or fluorine with respect to 100 parts by weight of polystyrene, incorporating thereinto at an elevated pressure a blowing agent comprising a hydrofluorocarbon having at least one hydrogen and containing no chlorine, to form a foamable molten resinous blend, and extruding it under a low pressure for foaming, (2) A process for preparing a polystyrene-based resin foam body, characterized by heating and melting in an extruder a resinous blend comprising 0.1 to 10 parts by weight of an oxy acid or its derivative with respect to 100 parts by weight of polystyrene, incorporating thereinto at an elevated pressure a blowing agent comprising a hydrofluorocarbon having at least one hydrogen and containing no chlorine, to form a foamable molten resinous blend, and extruding it under a low pressure for foaming.

(3) A polystyrene-based resin foam body characterized by comprising a matrix formed of a resinous blend comprising polystyrene and a polymer containing oxygen, nitrogen or fluorine and many closed cells formed in the matrix which contain a hydrofluorocarbon having at least one hydrogen and containing no chlorine. In other words, a polystyrene foam body characterized by being a polystyrene foam body formed of many closed cells, the membrane of the closed cells consisting of a resinous blend comprising polystyrene and a polymer containing oxygen, nitrogen or fluorine, and the cells encapsulating a hydrofluorocarbon having at least one hydrogen and containing no chlorine.

(4) A polystyrene-based resin foam body characterized by comprising a matrix formed of a resinous blend comprising polystyrene and an oxy acid or its derivative, and many closed cells formed in the matrix which contain a hydrofluorocarbon having at least one hydrogen and containing no chlorine. In other words, a polystyrene foam body characterized by being a polystyrene foam body formed of many closed cells, the membrane of the closed cells consisting of a resinous blend comprising polystyrene and an oxy acid or its derivative, and the cells encapsulating a hydrofluorocarbon having at least one hydrogen and containing no chlorine.

Here, the matrix constitutes cell walls defining cells and struts connecting the cell walls.

That is, in order to improve the low solubility of HFCs in polystyrene, the present invention proposes addition of a polymer with oxygen, nitrogen or fluorine in its molecular structure or an oxy acid or its derivative to polystyrene and extrusion foam molding, in the manner described below.

BEST MODE FOR CARRYING OUT THE INVENTION

A more detailed description of the invention will now be provided.

Polystyrenes which may be used according to the invention include homopolymers of styrene as well as α-methylstyrene, o-methylstyrene, m-methylstyrene, p-methylstyrene, α-ethylstyrene, α-chlorostyrene and α-bromostyrene, copolymers with styrene, and also polystyrenes modified by appropriate addition of styrene-butadiene rubber, etc.

According to the present invention, at least one polymer with oxygen, nitrogen or fluorine in its molecular structure, or an oxy acid or its derivative, is added to improve the low solubility of HFCs in the polystyrene.

Molecular structural differences between CFCs and HCFCs conventionally used as blowing agents and HFCs have been used to explain the reason for the low affinity (solubility) of the latter in polystyrene-based resins. That is, HFCs have no chlorine atoms in their molecules. As a result, HFCs have greater polarity than CFCs and HCFCs, and this lowers the affinity (solubility) to polystyrene which has remarkably low polarity. When blowing agents with low solubility in polystyrene are used, a higher internal pressure must be maintained in order to dissolve them in the molten resin and diffuse them evenly, and the added pressure results in a greater load on the equipment.

According to the invention, the affinity (solubility) of HFCs in blowing agents with respect to molten polystyrene-based resins is improved by adding one of the polymers or oxy acid compounds listed below and dispersing it in the polystyrene to provide polar groups in the polystyrene-based resin. This accelerates uniform diffusion of the HFC in the system, allowing addition of an amount of HFC sufficient to obtain the desired insulating properties without generating foam in the die, even under the low pressure conditions applied when CFCs and HCFCs, which are highly soluble in polystyrene, are used.

The following candidates may be mentioned as polymers containing oxygen, nitrogen or fluorine.

(1) Polymers containing acrylic acid or derivatives thereof. Examples include PMA (polymethyl acrylate), PEA (polyethyl acrylate), PIPA (polyisopropyl acrylate), PPA (poly(n-propyl) acrylate), PBA (poly(n-butyl) acrylate), PnHA (poly(n-hexyl) acrylate), as well as copolymers containing styrene or methyl methacrylate and ionomers or other components such as AAS (acrylonitrile-acrylic-styrene copolymer), MBA (methyl methylacrylate-butadienestyrene copolymer), SBA (styrene-butyl acrylate copolymer), MMA/BA copolymer (methyl methacrylate-butyl acrylate), etc.

(2) Polymers containing methacrylic acid or derivatives thereof. Examples include not only homopolymers such as PMMA (polymethyl methacrylate), PEMA (polyethyl methacrylate), PIPMA (polyisopropyl methacrylate), PnBMA (poly(n-butyl) methacrylate), PnHMA (poly(n-hexyl) methacrylate), PnPMA (poly(n-propyl) methacrylate), but also copolymers containing them in their molecular structure, and ionomer resins.

(3) Homopolymers and copolymers whose structural unit is maleic anhydride or a derivative thereof. Examples include SMA (styrene-maleic anhydride copolymer) resins and isobutylene-maleic anhydride copolymers.

(4) Homopolymers and copolymers whose structural unit is a polyanhydrous compound, polycarbonic acid ester (polycarbonate) or aromatic or aliphatic polyester synthesized from a fatty acid and polyhydric alcohol, or a derivative thereof.

(5) Homopolymers and copolymers whose structural unit is a compound with an ether bond, epoxy bond or ketone group in the main chain or a side chain, a vinyl ether compound, a polyvinyl alcohol or a derivative thereof. Examples include homopolymers of ethers such as PVF (polyvinyl formal), PVB (polyvinyl butyral), PEO (polyethylene oxide), PEG (polyethylene glycol), PPG (polypropylene glycol), PPrO (polypropylene oxide), PA (polyacetal), PVME (polyvinyl methyl ether), PVEE (polyvinyl ethyl ether), PVnPE (polyvinyl n-propyl ether), PVIPE (polyvinyl isopropyl ether), PViBE (polyvinyl isobutyl ether), PVnBE (polyvinyl n-butyl ether), PVA (polyvinyl alcohol), polyglycerine, polyoxyethylene sorbitol,-and their derivatives PVAc (polyvinyl acetate), PVE (polyvinyl ethylate), PVP (polyvinyl propylate), PVB (polyvinyl butylate), and copolymers such as EVA (ethylene-vinyl acetate copolymer) of which the above are repeating structural units. Of these, ethylene-vinyl acetate (67/33) copolymer is preferred.

(6) Silicone compounds, as oxygen-containing polymers.

(7) As polymers with nitrogen in the molecule there may be mentioned acrylonitrile compounds with an acrylonitrile group in the structure or repeating unit, compounds with a urea bond, amide bond (group) or urethane bond in the structure, such as polyurethane and polyamide compounds, as well as derivatives thereof. Examples include copolymers such as AES (acrylonitrile-EPDM-styrene copolymer) resins, SAN (styrene-acrylonitrile copolymer), ABS (acrylonitrile-butadiene-styrene copolymer) resins, ACS (acrylonitrile-polyethylene chloride-styrene copolymer) resins, etc.

(8) As fluorine-containing polymers, fluorovinyl ether compounds, fluorinated silicone and perfluoro polyethers, and homopolymers and copolymers with a fluoroalkyl group, fluoroalkenyl group, fluoroaryl group or fluoroaralkyl group in the main chain or a side chain.

(9) The polymer containing oxygen, nitrogen or fluorine may be a thermoplastic elastomer, and this includes those with matrixes of polyurethane, polyester, polyamide and polyfluorinated compounds.

As a result of further research, we obtained the result that the effect of improvement in the solubility of HFCs tends to be greater when the above-mentioned polymer molecules have crosslinking in their structure.

The following oxy acids and their derivatives may be mentioned as additives to be used for the purpose of improving the solubility of HFCs. Specifically, glycolic acid, lactic acid, hydroacrylic acid, α-oxybutyric acid, glyceric acid, tartronic acid, malic acid, tartaric acid, citric acid, salicylic acid, oxybenzoic acid, gallic acid, antellic acid, tropic acid triacetine, acetylacetone, ethyl acetoacetate, methyl acetoacetate, ethylglycol acetate, ethylene carbonate, methyl acetyl ricinoleate, butyl acetyl ricinoleate, butyl phthalylbutyl glycolate, acetyltriethyl citrate, tributyl acetylcitrate, etc.

The amount of the polymer to be added is 0.1 to 30 parts by weight to 100 parts by weight of polystyrene. This is because at less than 0.1 part by weight the expected effect of solubility improvement is not obtained, and at greater than 30 parts by weight, not only is there no effect of the added portion, but an adverse effect also occurs on the physical properties of the resulting foam body. The amount of the oxy acid or its derivative to be added is 0.1 to 10 parts by weight to 100 parts by weight of polystyrene. This is because at less than 0.1 part by weight the expected effect of solubility improvement is not obtained, and at greater than 10 parts by weight, not only is there no effect of the added portion, but an adverse effect also occurs on the dimensional stability and mechanical characteristics.

Of the polymers mentioned above, particular improvement in the solubility of HFCs, and more satisfactory foam moldability and foam body characteristics, may be achieved by the addition of homopolymers containing acrylic acid, methacrylic acid or a derivative thereof as a repeating unit and copolymers containing acrylic acid, methacrylic acid or a derivative thereof as a repeating unit, homopolymers containing a vinyl alkylate as a repeating unit, and copolymers containing a vinyl alkylate as a repeating unit.

Even more preferred of these are polymers containing MMA (methyl methacrylate), BA (butyl acrylate) or VA (vinyl acetate) in their structure. Copolymers containing a vinyl alkylate as a repeating structural unit, such as EDA (ethylene-vinyl acetate copolymer) are even more preferred.

The following 2 points have become clear regarding extrusion moldability and improvement of physical properties of the resulting foam bodies when HFCs are used as blowing agents with the above-mentioned polymers.

Firstly, the higher the proportion (weight ratio) of polar groups in the polymer, the more effective the improvement in the extrusion foam moldability. This may be explained by the fact that when a polymer with a large proportion of polar groups is added to a polystyrene-based resin, the increased number of polar groups present as a result in the resin blend raise the affinity toward HFCs.

Secondly, of polymers with equal proportions (weight ratios) of polar groups, those with a greater flowability or MFR (melt flow rate) are more effective at increasing the cell size and the cross-sectional area of the foam.

Also, addition of triacetin of the above-mentioned oxy acids and derivatives is particularly effective at improving the solubility of HFCs and providing more satisfactory foam moldability and foam body characteristics.

The blowing agent used is one containing at least one hydrofluorocarbon (HFC) with at least one hydrogen atom and no chlorine, as mentioned earlier. The HFC may be alone or in a mixture-based blowing agent containing other components as well.

The hydrofluorocarbon with at least one hydrogen atom and no chlorine in the molecule may be difluoromethane (F-32), pentafluoroethane (F-125), 1,1,1-trifluoroethane (F-143a), 1,1-difluoroethane (F-152a), 1,1,1,2-tetrafluoroethane (F-134a), 1,1,2,2-tetrafluoroethane (F-134), 1-fluoroethane (F-161a), etc. F-134a and F-152a are particularly preferred. Furthermore, F-134a, which in addition to being absolutely non-destructive to the ozone layer and having low thermal conductivity may retain this thermal conductivity over long periods of time because of low gas permeability to polystyrene resins, is most suited for attaining the object of the present invention.

The amount of the HFC to be added is 5 to 100 parts by weight to 100 parts by weight of the blowing agent, and it is preferably added at 0.05 mol or more with respect to 100 g of the aforementioned resinous blend from the standpoint of the insulating properties of the resulting foam body.

In the case of a mixture-based blowing agent, the mixture used may comprise, as additional blowing agents, one or more members selected from the group consisting of halogenated aliphatic hydrocarbons other than HFCs, aliphatic hydrocarbons, aliphatic alcohols, carbon dioxide and water.

As halogenated aliphatic hydrocarbons other than HFCs there may be mentioned ethyl chloride and methyl chloride. As aliphatic hydrocarbons there may be mentioned propane, n-butane, isobutane, n-pentane, isopentane, neo-pentane, cyclopentane and hexane. As aliphatic alcohols there may be mentioned methanol, ethanol, propanol and isopropanol.

Preferred combinations are (1) HFCs and aliphatic hydrocarbons, (2) HFCS, aliphatic hydrocarbons and carbon dioxide, (3) HFCs and halogenated aliphatic hydrocarbons, (4) HFCs, aliphatic halogenated hydrocarbons and carbon dioxide, (5) HFCS, aliphatic halogenated hydrocarbons and aliphatic hydrocarbons, and (6) HFCs and carbon dioxide.

The HFC component is preferably present in the blowing agent at 100 to 30 parts by weight. It is more preferably present at 100 to 60 parts by weight. When carbon dioxide is contained in a mixture-based blowing agent, it is preferably present at 3 parts by weight or less to 100 parts by weight of the aforementioned resinous blend. This is because if it is added in a high amount it will be difficult to obtain a satisfactory skin surface.

The amount of the blowing agent to be added is 5 to 30 parts by weight, and more preferably 10 to 20 parts by weight, to 100 parts by weight of the aforementioned resinous blend. At less than this range the desired expansion ratio and thermal conductivity cannot be obtained, and at greater than this range it becomes impossible for the blowing agent to completely dissolve in the resin, and this results in release of gas from the die and blowout, making it impossible to obtain a foam body with a satisfactory appearance. Even if dissolution is achieved, there is a greater load on the equipment.

If necessary, a filler, antioxidant, pigment, flame retardant, foam adjuster or a compatibilizer for the polymer or oxy acid or its derivative with the polystyrene, may be added to the foamable resinous blend.

The process for preparing polystyrene foam bodies according to the present invention may be carried out in the same manner as for the preparation of conventional polystyrene foam bodies, except for using as the base polymer a resinous blend of polystyrene and a polymer containing oxygen, nitrogen or fluorine, or a resinous blend of polystyrene and an oxy acid or its derivative, and using as the blowing agent one containing a hydrofluorocarbon with at least one hydrogen atom and no chlorine.

However, since according to the process of the present invention, the HFC used has high solubility in the polystyrene base polymer, a polystyrene foam body with a moderately high expansion ratio may be obtained without requiring equipment with high-pressure specifications. In other words, foam bodies with properties equivalent to polystyrene foam bodies prepared with the presently used HCFCs and CFCs (expansion ratio of 15- to 50-fold, cell size of 0.10 to 0.55 mm, thermal conductivity of 0.019 to 0.024 kcal/m.h. ° C.) may be prepared using 5 to 10 parts by weight of HFC to 100 parts by weight of resinous blend, under the same processing conditions (die pressure of 30–60 kg).

Molecular structural differences between CFCs and HCFCs conventionally used as blowing agents and HFCs can explain the reason for the low affinity (solubility) of the latter in polystyrene. That is, HFCs have no chlorine atoms in their molecules. As a result, HFCs have greater polarity than CFCs and HCFCs, and this lowers the affinity (solubility) to polystyrene which has remarkably low polarity. When blowing agents with low solubility in polystyrene are used, higher internal pressure must be maintained in order to dissolve them in the molten resin and diffuse them uniformly, and the added pressure results in a greater load on the equipment.

According to the invention, the affinity (solubility) of HFCs in blowing agents with respect to molten polystyrene-based resins is improved by adding one of the polymer or monomer compounds listed above and dispersing it uniformly in the polystyrene to provide polar groups in the polystyrene-based resinous blend. This accelerates uniform diffusion of the hydrofluorocarbon in the system, allowing addition of an amount of HFC sufficient to obtain the desired insulating properties even under the low pressure conditions applied when HCFCs, which are more highly soluble than HFCs in polystyrene, are used.

EXAMPLES

The invention is explained in detail below with reference to the following examples and comparative examples.

For each of the samples obtained, the physical characteristics were measured and the extrusion moldability was evaluated, and the results thereof together with the various mixing proportions are given in Tables 1 to 3. The mixing proportions are expressed in terms of percentage by weight. The measurement of physical characteristics and evaluation of extrusion moldability were according to the following methods.

*1) Foam density: According to JIS A 9511

*2) Average cell size: According to ASTM D 3567

*3) Skin condition: x=very poor; ∆=somewhat poor; o=good; ⊗=very good

*4) Foam cross-sectional area: x=small; ∆=somewhat small; o=larger; ⊙=very large.

*5) Minimum die pressure: Minimum die pressure (gauge pressure) needed to prevent internal foaming with die nozzle.

*6) Melt flow rate: According to JIS K 6730 Polymers
1) Polymethyl methacrylate
2) Styrene-butyl acrylate (88/12) copolymer
3) Ethylene-vinyl acetate (72/28) copolymer
4) Polyvinyl formal (VF=81%)
5) Isobutylene-maleic anhydride (50/50) copolymer
6) Polybutylene succinate
7) Styrene-acrylonitrile (70/30) copolymer
8) Caprolactam base, thermoplastic polyurethane elastomer (no crosslinking)
9) Caprolactam base, thermoplastic polyurethane elastomer (partial crosslinking)
10) Methyl methacrylate/butyl acrylate (74/26) copolymer (partial crosslinking)
11) Methyl methacrylate/butyl acrylate (64/36) copolymer (partial crosslinking)

12) Methyl methacrylate/butyl acrylate (80/20) copolymer (abundant crosslinking)
13) Methyl methacrylate/styrene/butyl acrylate (50/30/20) copolymer (abundant crosslinking)
14) Ethylene-vinylacetate (67/33) copolymer Examples 1–20 and Comparative Examples 1–4

Resinous blends were prepared by blending, with respect to 100 parts by weight of the polystyrene resins shown in Tables 1 to 3 (products of Sumitomo Kagaku Kogyo), 0.1 part by weight of a foaming adjuster (talc), 2.0 parts by weight of a flame retardant (hexabromocyclododecane), 0.05 part by weight of a neutralizer (magnesium oxide), 0.1 part by weight of a lubricant (calcium stearate) and each of the additives listed in Tables 1 to 3 in the amounts listed in each table, and the resinous blends were fed into a screw extruder with an inner diameter of 40 mm$\phi$ at a constant rate of about 20 kg every hour. Mixed blowing agents in the amounts listed in Tables 1 to 3 were injected into the molten resins near the tip of the extruder and uniformly kneaded therewith. The foamable compositions were then extruded into the air and foamed from a nozzle (die) with a 10 mm width×2 mm spacing provided at the tip of the extruder, at a foaming temperature of about 125° C., to obtain sheet foam bodies.

Examples 21–34 and Comparative Examples 5–7

Resinous blends were prepared by blending, with respect to 100 parts by weight of the polystyrene resins shown in Table 4 (products of Sumitomo Kagaku Kogyo), 2.5 parts by weight of a flame retardant (hexabromocyclododecane), 0.2 part by weight of a neutralizer (anhydrous sodium pyrophosphate), 0.05 part by weight of a lubricant (barium stearate), 0.2 part by weight of a colorant, and each of the additives listed in Table 4 in the amounts listed therein, and the resinous blends were fed into a screw extruder with an inner diameter of 60 mm$\phi$ at a constant rate of about 90 kg every hour. Mixed blowing agents in the amounts listed in Table 4 were injected into the molten resins near the tip of the extruder and uniformly kneaded therewith. The foamable compositions were then extruded into the air and foamed from a nozzle (die) with an approximately 75 mm width×2 mm spacing provided at the tip of the extruder, at a foaming temperature of about 123° C., to obtain sheet foam bodies.

Examples 35–42 and Comparative Example 8

Resinous blends were prepared by blending, with respect to 100 parts by weight of the polystyrene resins shown in Table 5 (products of Sumitomo Kagaku Kogyo), 2.5 parts by weight of a flame retardant (hexabromocyclododecane), 0.2 part by weight of a neutralizer (anhydrous sodium pyrophosphate), 0.05 part by weight of a lubricant (barium stearate), 0.2 part by weight of a colorant, and each of the EVA (ethylene-vinyl acetate) copolymers with the different VA (vinyl acetate) contents and flow rates listed in Table 5 in the amounts listed therein, and the resinous blends were fed into a screw extruder with an inner diameter of 40 mm$\phi$ at a constant rate of about 20 kg every hour. Mixed blowing agents in the amounts listed in Table 5 were injected into the molten resins near the tip of the extruder and uniformly kneaded therewith. The foamable compositions were then extruded into the air and foamed from a nozzle (die) with a 10 mm width×2 mm spacing provided at the tip of the extruder, at a foaming temperature of about 123° C., to obtain sheet foam bodies.

TABLE 1

| | Examples | | | | | | | | Comp. Examples | |
|---|---|---|---|---|---|---|---|---|---|---|
| | 1 | 2 | 3 | 4 | 5 | 6 | 7 | 8 | 1 | 2 |
| F-134a | 8.0 | 8.0 | 8.0 | 8.0 | 8.0 | 8.0 | 8.0 | 8.0 | 8.5 | 8.0 |
| F-152a | 5.5 | 5.5 | 5.5 | 5.5 | 5.5 | 5.5 | 5.5 | 5.5 | 5.2 | 5.5 |
| Ethyl chloride | | | | | | | | | | |
| $CO_2$ | | | | | | | | | | |
| PMMA[1] | | | | | | | | | | |
| SBA[2] | 15.2 | | | | | | | | | |
| EVA[3] | | 7.0 | | | | | | | | |
| PVF[4] | | | 7.0 | | | | | | | |
| Isobutylene-maleic anhydride[5] | | | | 7.0 | | | | | | |
| Copolymer PBSU[6] | | | | | | 1.0 | | | | |
| SAN[7] | | | | | | | 7.0 | | | |
| Thermoplastic polyurethane[8] | | | | | | | | 7.0 | | |
| Thermoplastic polyurethane[9] | | | | | | | | | 7.0 | |
| MMA/BA[10] | | | | | | | | | | |
| MMA/BA[11] | | | | | | | | | | |
| MMA/BA[12] | | | | | | | | | | |
| MMA/BA/PS[13] | | | | | | | | | | |
| Foam density (kg/m$^3$)*1) | 35.1 | 31.7 | 34.9 | 36.4 | 31.7 | 37.6 | 35.2 | 37.5 | 39.5 | 38.6 |
| Average cell size (mm)*2) | 0.10 | 0.17 | 0.09 | 0.13 | 0.16 | 0.09 | 0.20 | 0.55 | 0.05 | 0.06 |
| Minimum die pressure (kg/cm$^2$)*5) | 40 | 45 | 40 | 50 | 40 | 45 | 40 | 35 | 70 | 65 |
| Foam cross-sectional | ○ | ⊙ | ○ | ○ | ○ | ○ | ⊙ | ⊙ | x | x |

TABLE 1-continued

|  | Examples | | | | | | | | Comp. Examples | |
| --- | --- | --- | --- | --- | --- | --- | --- | --- | --- | --- |
|  | 1 | 2 | 3 | 4 | 5 | 6 | 7 | 8 | 1 | 2 |
| area*4) |  |  |  |  |  |  |  |  |  |  |
| Skin texture*3) | ⊙ | ⊙ | ○ | ○ | ○ | ○ | ⊙ | ⊙ | x | x |

TABLE 2

|  | Examples | | | | | | | | Comp. Examples | |
| --- | --- | --- | --- | --- | --- | --- | --- | --- | --- | --- |
|  | 9 | 10 | 11 | 12 | 13 | 14 | 15 | 16 | 1 | 2 |
| F-134a | 8.0 | 8.0 | 8.0 | 8.0 | 8.0 | 8.5 | 8.5 | 9.5 | 8.5 | 8.0 |
| F-152a | 5.5 | 5.5 | 5.5 | 5.5 | 5.5 | 5.2 | 5.5 | 4.5 | 5.2 | 5.5 |
| Ethyl chloride |  |  |  |  |  |  |  |  |  |  |
| $CO_2$ |  |  |  |  |  |  |  |  |  |  |
| PMMA[1] |  |  |  |  |  |  |  |  |  |  |
| SBA[2] |  |  |  |  |  |  |  |  |  |  |
| EVA[3] |  |  |  |  |  |  |  |  |  |  |
| PVF[4] |  |  |  |  |  |  |  |  |  |  |
| Isobutylene-maleic anhydride[5] Copolymer |  |  |  |  |  |  |  |  |  |  |
| PBSU[6] |  |  |  |  |  |  |  |  |  |  |
| SAN[7] |  |  |  |  |  |  |  |  |  |  |
| Thermoplastic polyurethane[8] |  |  |  |  |  |  |  |  |  |  |
| Thermoplastic polyurethane[9] |  |  |  |  |  |  |  |  |  |  |
| MMA/BA[10] | 3.0 | 7.0 |  |  |  | 7.0 | 3.0 | 7.0 |  |  |
| MMA/BA[11] |  |  | 3.0 |  |  |  |  |  |  |  |
| MMA/BA[12] |  |  |  | 1.0 |  |  |  |  |  |  |
| MMA/BA/PS[13] |  |  |  |  | 1.0 |  |  |  |  |  |
| Foam density $(kg/m^3)$*1) | 35.8 | 35.4 | 33.8 | 33.9 | 33.6 | 35.6 | 36.3 | 39.9 | 39.5 | 38.6 |
| Average cell size (mm)*2) | 0.14 | 0.19 | 0.22 | 0.10 | 0.12 | 0.15 | 0.10 | 0.08 | 0.05 | 0.06 |
| Minimum die pressure $(kg/cm^2)$*5) | 45 | 45 | 45 | 45 | 45 | 45 | 50 | 60 | 70 | 65 |
| Foam cross-sectional area*4) | ⊙ | ⊙ | ⊙ | ○ | ○ | ⊙ | ○ | ⊙ | x | x |
| Skin texture*3) | ⊙ | ⊙ | ⊙ | ○ | ○ | ⊙ | ○ | ⊙ | x | x |

TABLE 3

|  | Examples | | | | Comp. Examples | |
| --- | --- | --- | --- | --- | --- | --- |
|  | 18 | 18 | 19 | 20 | 3 | 4 |
| F-134a | 8.0 | 8.0 |  |  |  | 8.0 |
| F-152a |  |  | 5.9 | 5.9 | 5.9 |  |
| n-butane | 1.9 | 1.9 |  |  |  | 1.9 |
| Ethyl chloride | 3.0 | 3.0 | 3.0 | 3.0 | 3.0 | 3.0 |
| $CO_2$ |  |  | 1.5 | 1.5 | 1.5 |  |
| PMMA[1] |  |  |  | 20.0 |  |  |
| SBA[2] |  |  |  |  |  |  |
| EVA[3] |  |  |  |  |  |  |
| PVF[4] |  |  |  |  |  |  |
| Isobutylene-maleic anhydride[5] |  |  |  |  |  |  |
| Copolymer PBSU[6] |  |  |  |  |  |  |
| SAN[7] |  |  |  |  |  |  |
| Thermoplastic polyurethane[8] |  |  |  |  |  |  |
| Thermoplastic polyurethane[9] |  | 7.0 |  |  |  |  |
| MMA/BA[10] |  |  |  |  |  |  |
| MMA/BA[11] |  |  | 7.0 |  |  |  |
| MMA/BA[12] |  |  |  |  |  |  |
| MMA/BA/PS[13] | 3.0 |  |  |  |  |  |
| Foam density $(kg/m^3)$*1) | 35.5 | 34.5 | 37.3 | 36.9 | 39.1 | 36.0 |
| Average cell size (mm)*2) | 0.16 | 0.22 | 0.23 | 0.22 | 0.12 | 0.09 |
| Minimum die | 45 | 45 | 45 | 40 | 55 | 65 |

TABLE 3-continued

|  | Examples | | | | Comp. Examples | |
| --- | --- | --- | --- | --- | --- | --- |
|  | 18 | 18 | 19 | 20 | 3 | 4 |
| pressure (kg/cm$^2$)*5) | | | | | | |
| Foam cross-sectional area*4) | ⊙ | ⊙ | ⊙ | ⊙ | Δ | x |
| Skin texture*3) | ⊙ | ⊙ | ⊙ | ⊙ | Δ | x |

TABLE 4

|  | Examples | | | | | | | | | | | | | Comp. Examples | | |
| --- | --- | --- | --- | --- | --- | --- | --- | --- | --- | --- | --- | --- | --- | --- | --- | --- |
|  | 21 | 22 | 23 | 25 | 26 | 27 | 28 | 29 | 30 | 31 | 32 | 33 | 34 | 5 | 6 | 7 |
| F-134a | 8.0 | 8.0 | 8.0 | 8.0 | 6.0 | 8.0 | 8.0 | 8.0 | 8.0 | 8.0 | 8.0 | 8.0 | 8.0 | 8.0 | 8.0 | 6.0 |
| CO$_2$ | 0.6 | 0.6 | 0.6 | | 1.5 | 0.6 | 0.6 | | | | | | | 0.6 | | 1.5 |
| Ethyl chloride | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| n-butane | | | | 0.5 | | | | 0.5 | 0.5 | 0.5 | 0.5 | 0.5 | 0.5 | | 0.5 | |
| Isobutane | | | | 0.2 | | | | 0.2 | 0.2 | 0.2 | 0.2 | 0.2 | 0.2 | | 0.2 | |
| EVA$^{14)}$ | 3.0 | 6.0 | | 3.0 | | | | 1.0 | 2.0 | | | | | | | |
| Triacetin | | | 2.0 | | 2.0 | | | | | 0.75 | 1.5 | | | | | |
| PMMA$^{1)}$ | | | | | | | | | | | | 5.0 | 10.0 | | | |
| MMA/BA$^{10)}$ | | | | | | 3.0 | | | | | | | | | | |
| MMA/BA/PS$^{13}$ | | | | | | | 4.0 | | | | | | | | | |
| Foam density (kg/m$^3$)*1) | 36.7 | 34.9 | 34.9 | 33.5 | 32.5 | 40.1 | 38.9 | 38.9 | 36.4 | 35.9 | 34.3 | 35.1 | 35.2 | 41.5 | 38.3 | 37.8 |
| Average cell size (mm)*2) | 0.12 | 0.18 | 0.15 | 0.28 | 0.28 | 0.10 | 0.10 | 0.18 | 0.26 | 0.26 | 0.41 | 0.33 | 0.41 | 0.04 | 0.13 | 0.13 |
| Minimum die pressure (kg/cm$^2$)*5) | 50 | 45 | 48 | 40 | 55 | 60 | 60 | 50 | 45 | 50 | 45 | 40 | 40 | 70 | 65 | 65 |
| Foam cross-sectional area*4) | ○ | ◎ | ◎ | ◎ | ◎ | ○ | ○ | ◎ | ◎ | ◎ | ◎ | ◎ | ⊙ | x | Δ | x |
| Skin texture*3) | ⊙ | ⊙ | ⊙ | ⊙ | ⊙ | ○ | ○ | ◎ | ◎ | ◎ | ◎ | ◎ | ◎ | x | Δ | x |

TABLE 5

|  | Examples | | | | | | | | Comp. Example |
| --- | --- | --- | --- | --- | --- | --- | --- | --- | --- |
|  | 35 | 36 | 37 | 38 | 39 | 40 | 41 | 42 | 8 |
| F-134a | 8.0 | 8.0 | 8.0 | 8.0 | 8.0 | 8.0 | 8.0 | 8.0 | 8.0 |
| Ethyl chloride | 5.5 | 5.5 | 5.5 | 5.5 | 5.5 | 5.5 | 5.5 | 5.5 | 5.5 |
| VA content (wt %) | 10 | 10 | 20 | 20 | 28 | 28 | 33 | 33 | |
| Melt flow rate (g/10 min)*6) | 6 | 70 | 20 | 300 | 6 | 15 | 25 | 30 | |
| Amount added (wt %) | 3 | 3 | 3 | 3 | 3 | 3 | 3 | 3 | |
| Foam density (kg/m$^3$)*1) | 31.9 | 31 | 31.4 | 30.6 | 31.5 | 31 | 30.6 | 30.5 | 36.6 |
| Average cell size (mm)*2) | 0.15 | 0.18 | 0.17 | 0.19 | 0.17 | 0.18 | 0.24 | 0.25 | 0.09 |
| Minimum die pressure (kg/cm$^2$)*5) | 55 | 55 | 50 | 50 | 45 | 45 | 43 | 43 | 65 |
| Foam cross-sectional area*4) | ○ | ⊙ | ⊙ | ⊙ | ⊙ | ⊙ | ⊙ | ⊙ | x |
| Skin texture*3) | ⊙ | ⊙ | ⊙ | ⊙ | ⊙ | ⊙ | ⊙ | ⊙ | x |

Industrial Applicability

As mentioned above, by employing the mixed blowing agents listed above which are composed mainly of HFCs according to the present invention, it becomes possible to easily and stably prepare polystyrene-based resin foam bodies with low density, excellent insulating properties and desired cross-sectional sizes by existing processes, but completely without the use of harmful blowing agents such as F-12, F-11, F-142b, F-22 and the like, which are known to be destructive to the ozone layer.

We claim:

1. A process for preparing a polystyrene-based resin foam body, characterized by comprising:
    hearing and melting in extruder a resinous blend comprising polystyrene and a polymer containing oxygen, nitrogen, or fluorine;
    incorporating into the melt resinous blend at an elevated pressure a blowing agent comprising a hydrofluorocarbon having at least one hydrogen and not having chlorine, to form a foamable melt resinous blend;
    extruding said foamable melt resinous blend under a low pressure.

2. A process for preparing a polystyrene-based resin foam body according to claim 1, wherein said polymer is selected from the group consisting of a phomopolymer comprised of as a repeating unit acrylic acid, methacrylic acid or a derivative thereof; a copolymer comprised of as repeating unit acrylic acid, methacrylic acid or a derivative thereof; a copolymer comprised of as repeating unit vinyl alkylate; and a copolymer comprised of as repeating unit vinyl alkylate.

3. A process for preparing a polystyrene resin foam body according to claim 1, wherein said copolymer comprised of as repeating unit vinyl alkylate is EVA (ethylene-vinylacetate copolymer).

4. A process for preparing a polystyrene resin foam body according to claim 1, wherein 1,1,1,2-tetrafluoroethane is used as said flowing agent.

5. A process for preparing a polystyrene-based resin foam body, characterized by comprising:
    heating and melting in extruder a resinous blend comprising polystyrene and an oxy acid or its derivative;
    incorporating into the melt resinous blend at an elevated pressure a blowing agent comprising a hydrofluorocarbon having at least one hydrogen & not having chlorine, to form a foamable melt resinous blend; and
    extruding the foamable melt resinous blend and a low pressure.

6. A process for preparing a polystyrene-based resin foam body according to claim 5, wherein said oxy acid or its derivative is triacetine.

7. A process for preparing a polystyrene-based resin foam body according to claim 5, wherein 1,1,1,2-tetrafluoroethylene is used as said flowing agent.

8. A polystyrene-based resin foam body, characterized by comprising:
    a matrix formed of a resinous blend comprising polystyrene and a polymer containing oxygen, nitrogen, or fluorine; and
    many closet cells formed in the matrix, containing a hydrofluorocarbon having at least one hydrogen and not having chlorine.

9. A polystyrene-based resin foam body according to claim 8, wherein said polymer is selected from the group consisting of a homopolymer comprised of as a repeating unit acrylic acid, methacrylic acid or a derivative thereof; a copolymer comprised of as repeating unit acrylic acid, methacrylic acid or a derivative thereof; a copolymer comprised of as repeating unit vinyl alkylate; and a copolymer comprised of as repeating unit vinyl alkylate.

10. A polystyrene-based resin foam body according to claim 9, wherein said copolymer comprised of as repeating unit vinyl alkylate is EVA (ethylene-vinylacetate copolymer).

11. A polystyrene-based resin foam body according to claim 8, wherein said fluorohydrocarbon is 1,1,1,2-tetrafluoroethane.

12. A polystyrene-based resin foam body, characterized by comprising:
    a matrix formed of a resinous blend comprising polystyrene and an oxy acid or its derivative; and
    many closed cells formed in the matrix, containing a hydrofluorocarbon having at least one hydrogen and not having chlorine.

13. A polystyrene-based resin foam body, according to claim 12, wherein said oxy acid or its derivative is triacetine.

14. A polystyrene-based resin foam body, according to claim 12, wherein said fluorohydrocarbon is 1,1,1,2-tetrafluoroethane.

* * * * *